Patented June 15, 1943

2,321,693

UNITED STATES PATENT OFFICE 2,321,693

EMULSION POLYMERIZATION OF HALOGEN-2-BUTADIENES-1,3

Kurt Meisenburg and Ingofroh Dennstedt, Leverkusen I. G.-Werk, and Ewald Zaucker, Halle-on-the-Saale, Germany; vested in the Alien Property Custodian No Drawing. Original application February 28, 1938, Serial No. 193,060. Divided and this application October 17, 1940, Serial No. 361,582. In Germany March 2, 1937

11 Claims. (Cl. 260—92.7)

The present invention relates to a new process of polymerizing butadienes-1.3 and to the new polymerizates which are obtainable thereby.

It is known that the polymerization of butadienes-1.3 easily results in the formation of products which are insoluble in benzene and resemble vulcanized rubber rather than the unvulcanized product. In consequence thereof, the working up of these products on the roller and the incorporation therewith of filling materials and the ingredients which are necessary for effecting vulcanization involve considerable difficulties. Moreover, the mechanical properties of the vulcanizates obtained from such products are materially impaired when compared with those vulcanizates obtained from benzene soluble polymerizates. In order to avoid these disadvantages it has been proposed to effect the heat polymerization of butadienes-1.3 in the presence of sulfur or certain sulfur containing compounds. It is not disputed that certain improvements are obtained thereby; however, by the use of these additions the disadvantage is involved that the course of the polymerization is considerably retarded; moreover, the presence of sulfur and the said sulfur containing compounds may result in the formation of undesired dimeric by-products.

It is the object of the present invention to do away with these disadvantages and to develop a new process which allows one to polymerize butadienes-1.3 in a nearly quantitative yield without retarding the course of the reaction and without involving the formation of products which are insoluble in benzene or of dimeric products. Other objects of our invention will be apparent from the following description and claims.

It has been found that organic sulfur containing compounds which are soluble in the monomeric products to be polymerized exert a remarkable regulating effect upon the course of the emulsion polymerization. Those sulfur containing products are preferred which contain at least 2 sulfur atoms directly connected with each other, i. e. organic disulfides. Examples of suitable regulators are dialkylxanthogendisulfides and di(benzoic acid ester) tetra sulfides. In most cases an amount of less than 1% of these regulators (calculated on the amount of monomeric products) is sufficient to exert the desired effect; in other cases scmewhat higher amounts are required. Depending on the amount of the regulators the resulting polymerizates either resemble natural rubber or are of a more plastic nature, the yield and solubility in organic solvents such as benzene being excellent regardless of the amount of such regulators. In this respect our new process is superior to the hitherto employed heat polymerization in the presence of sulfur and sulfur containing compounds, since in the latter case the amount of the regulators must be carefully controlled if a good yield is to be combined with a good solubility of the polymerizates.

The new process can be applied to every polymerizable butadiene-1.3, the latter term being intended to comprise the unsubstituted butadiene as well as the homologues and substitution products thereof such as isoprene, 2-chloro-butadiene-1.3 or 2-bromo-butadiene-1.3. As a matter of fact, also mixtures of such butadienes with other polymerizable compounds such as styrene or acrylic acid nitrile can be employed. It is to be understood that such sulfur containing regulators are preferred, as have only a weak vulcanizing effect or no such effect at all.

The following examples illustrate the present invention without, however, restricting it thereto the parts being by weight:

Example 1

0.5 part of diisopropylxanthogendisulfide dissolved in
69 parts of butadiene are emulsified in
200 parts of a 5% sodium oleate solution containing
0.3 part of ammonium persulfate.

After a several days' shaking a soluble plastic polymerizate is obtained in a quantitative yield.

Example 2

0.1 part of diisopropylxanthogendisulfide dissolved in
52 parts of butadiene and
22 parts of styrene are emulsified in
200 parts of a 5% sodium oleate solution containing
0.3 part of ammonium persulfate.

After a several days' shaking at 30° and upon coagulation there is obtained in a nearly quantitative yield an easily soluble mixed polymerizate which shows excellent mechanical properties.

Example 3

0.2 part of diisopropylxanthogendisulfide dissolved in
47.5 parts of 2-chlorobutadiene-1.3 and
2.5 parts of 1-phenoxypropeneoxide-2.3 are poured into
50 parts of a 2% sodium oleate solution while thoroughly stirring and kept at a temperature of 20–30°. In a nearly quantitative yield a benzene soluble polymerizate is thus obtained.

Example 4

0.4 part of diethylxanthogendisulfide dissolved in
180 parts of 2-chlorobutadiene-1.3,
10 parts of acrylic acid nitrile and
10 parts of 1-phenoxypropeneoxide-2,3 are poured into
200 parts of a 2% sodium oleate solution.

On working up a soluble polymerizate is obtained which can easily be rolled and which on vulcanizing shows excellent mechanical properties.

Example 5

0.1 part of di-(benzoic acid methylester)-tetrasulfide are dissolved in
47.5 parts of 2-chlorobutadiene-1.3 and
2.5 parts of 1-phenoxypropeneoxide-2.3.

Thereupon this solution is emulsified in 50 parts of a 2% sodium oleate solution. In a good yield a soluble polymerizate is thus obtained which can easily be worked up.

Example 6

0.4 part of diisopropylxanthogendisulfide is dissolved in
180 parts of 2-chlorobutadiene-1.3,
10 parts of styrene and
10 parts of phenoxypropeneoxide;

thereupon this solution is emulsified in 200 parts of a 2% solution of di-isobutylnaphthalene sulfonate containing 8 parts of sodium lye. On polymerizing at 20–30° a soluble product is obtained which can easily be worked up on the roller and which on vulcanizing shows excellent mechanical properties.

Example 7

75 parts of butadiene and
25 parts of styrene are emulsified in
142 parts of water having dissolved therein
3 parts of sodium diisobutyl naphthalene sulfonate
0.2 part of sodium hydroxide and
0.375 part of potassium persulfate.

Polymerization is effected by a 5 to 6 hours' shaking at 30°. The following table shows the yield of soluble polymerizates obtained under the influence of varying amounts of tolyldisulfide as regulator:

| Amount of regulator in per cent of polymerizable substances | Yield of soluble polymerizates in per cent of the theoretical amount |
|---|---|
| 3 | 91 |
| 4 | 92 |
| 5 | 92 |

Example 8

100 parts of 2-chlorobutadiene-1.3 are emulsified in
100 parts of a 2% sodium oleate solution and with the addition of
3 parts of 1-phenoxypropeneoxide-2.3.

Polymerization is effected by a 4 to 5 hours' heating to 30°. The yield of soluble polymerizates is 78% even if only 1% of tolyltrisulfide is present as regulator.

This application is a division of our application Serial No. 193,060 filed Feb. 28, 1938, now U. S. Patent No. 2,248,107 dated July 8, 1941.

We claim:

1. The process which comprises the emulsion polymerization of halogen-2-butadienes-1.3 in the presence of such organic sulfur-containing compounds as contain at least two carbon atoms directly connected to each other and are soluble in the monomers to be polymerized, said compounds being selected from the class consisting of dialkylxanthogendisulfides, di(benzoic acid ester)-tetrasulfides, tolyldisulfide and tolyltrisulfide.

2. The process as defined in claim 1 wherein mixtures of halogen-2-butadienes-1.3 with other compounds capable of forming copolymerizates with halogen-2-butadienes-1.3 in aqueous emulsion are employed.

3. The process as defined in claim 1 wherein the halogen-2-butadiene-1.3 is chloro-2-butadiene-1.3.

4. The process as defined in claim 1 wherein chloro-2-butadiene-1.3 is copolymerized with acrylic acid nitrile.

5. The process as defined in claim 1 wherein chloro-2-butadiene-1.3 is copolymerized with styrene.

6. The process as defined in claim 1 wherein chloro-2-butadiene-1.3 is polymerized in the presence of a dialkylxanthogendisulfide.

7. The process as defined in claim 1 wherein chloro-2-butadiene-1.3 is copolymerized with acrylic acid nitrile in the presence of a dialkylxanthogendisulfide.

8. The process as defined in claim 1 wherein chloro-2-butadiene-1.3 is copolymerized with styrene in the presence of a dialkylxanthogendisulfide.

9. The process which comprises emulsion polymerizing chloro-2-butadiene-1.3 in the presence of diisobutylxanthogendisulfide.

10. The process which comprises emulsion copolymerizing chloro-2-butadiene-1.3 with acrylic acid nitrile in the presence of diisobutylxanthogendisulfide.

11. The process which comprises emulsion copolymerizing chloro-2-butadiene-1.3 with styrene in the presence of diisobutylxanthogendisulfide.

KURT MEISENBURG.
INGOFROH. DENNSTEDT.
EWALD ZAUCKER.